United States Patent [19]
Gittos

[11] 3,895,014
[45] July 15, 1975

[54] PROCESS FOR PREPARING 1-ALKYLTHIO-3,4-DIHYDRO (AROMATIC [c]) PYRIDINES

[75] Inventor: Maurice Ward Gittos, Slough, England

[73] Assignee: Aspro-Nicholas Limited, Slough, England

[22] Filed: Apr. 12, 1973

[21] Appl. No.: 350,669

[30] Foreign Application Priority Data
Apr. 13, 1972 United Kingdom............... 17033/72

[52] U.S. Cl. ....... 260/283 S; 260/283 SY; 260/454; 260/294.8 C; 260/294.8 D; 424/258; 424/263
[51] Int. Cl.² ........................................ C07D 217/22
[58] Field of Search ....... 260/283 S, 283 SY, 290 P, 260/294.8 C

[56] References Cited
UNITED STATES PATENTS

| | | | |
|---|---|---|---|
| 3,337,539 | 8/1967 | Mészáros | 260/283 S |
| 3,644,366 | 2/1972 | Jeanmart et al. | 260/283 S |
| 3,652,570 | 3/1974 | Giltos et al. | 260/283 S |

OTHER PUBLICATIONS

Chemical Abstracts; Vol. 72; Giltos et al; p. 12601w, 1970.

Tamayo et al; Tetrahedron Supp. 8; part I, p. 305–312; 1966.

*Primary Examiner*—Donald G. Daus
*Assistant Examiner*—Mary C. Vaughn

[57] ABSTRACT

3,4-dihydro (aromatic[c]) pyridines and 3,4,5,6-tetrahydro (aromatic[c]) pyrazines which are substituted in their 1-position by an alkylthio, alkylseleno or alkyltelluro group, especially 1-alkylthio-3,4-dihydroisoquinolines, are prepared by contacting the corresponding 2-aromatic-ethyl isocyanate analogue having an unsubstituted ring carbon atom adjacent to the ring carbon atom attached to the ethyl isocyanate analogue group with a compound including the corresponding incipient alkyl carbonium ion, especially an alkyl fluorosulphonic or perfluorinated alkyl sulphonic acid ester or a trialkyl-oxonium tetrafluoroborate. The reaction may be carried out in a solvent under reflux conditions at a temperature of 20° to 150°C. The products are intermediates in the preparation of the corresponding 1-amino compounds some of which have been shown to have useful pharmacological activity.

17 Claims, No Drawings

PROCESS FOR PREPARING 1-ALKYLTHIO-3,4-DIHYDRO (AROMATIC [C]) PYRIDINES

The present invention relates to compounds having as a substituent on an aromatic nucleus an N-alkylene-thiomidate (i.e.

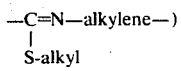

group or a selenium or tellurium analogue thereof. In particular, the invention provides a novel process for the preparation of such compounds in which the N-alkylene imino moiety constitutes part of a dihydropyridine or tetrahydropyrazine ring fused to an aromatic nucleus.

Compounds having an N-alkylene-thioimidate group are useful intermediates for the preparation of inter alia amidino compounds, many of which amidino compounds are pharmaceutically active. In particular, as disclosed in our U.K. Patent Specification No. 1,244,501, certain 1-alkylthio-3,4-dihydroisoquinolines (i.e., 1-alkylthio-3,4-dihydrobenz[c]-pyridines) may be reacted in manner known per se with amines to form 1-amino-3,4-dihydroisoquinolines having cardiovascular activity. Previously, the 1-alkylthio-3,4-dihydroisoquinoline reactants have been prepared inter alia from a phenethyl isothiocyanate of formula i

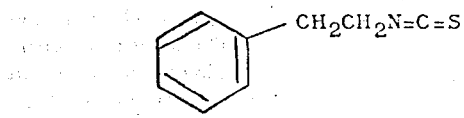

or a substituted derivative thereof by, as a first stage, heating with a Friedel-Crafts catalyst, for example $AlCl_3$ or $H_3PO_4$, to form a 1,2,3,4-tetrahydroisoquinoline-1-thione of formula ii

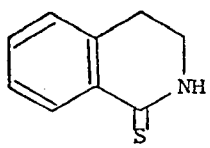

or substituted derivative thereof and thereafter reacting the thione with a suitable alkylating agent, for example an alkyl halide, sulphate or sulphonate. The thione is obtained in low yield and therefore it often is necessary to use relatively high temperatures, for example of the order of 200°C, and lengthy reaction times, for example of the order of 24 hours, to obtain a useful yield.

It has been proposed by Lora-Tamayo et al (see Advances in Heterocyclic Chemistry, Katritzky and Boulton, Volume 6, 1966, pages 112–114) to prepare 1-alkylthio-3,4-dihydroisoquinolines by heating together a β-halogenoalkylbenzene of formula iii

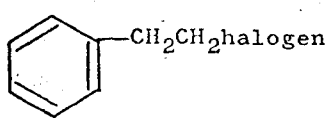

or a substituted derivative thereof, and a thiocyanate of formula iv

in the presence of stannic chloride. Unfortunately, the process has to be carried out in the absence of a solvent and is difficult to control. It is therefore not suitable for commercial scale preparations.

The Inventor has found that 1-alkylthio-3,4-dihydroisoquinolines can be prepared in good yields directly from 2-phenethyl isothiocyanates by contacting the isothiocyanate with an incipient alkyl carbonium ion. He has found also that the process has application to the formation of analogous compounds in which the fused benzene ring of the dihydroisoquinoline nucleus is replaced by another aromatic ring system. Further, the process is applicable to the preparation of analogous compounds in which the alkylthio group is replaced by a selenium or tellurium analogue thereof.

The improvement of yield resultant upon using the process of the present invention is illustrated by comparing the cyclisation of 2-phenylisobutylisothiocyanate using the known Friedel-Crafts cyclisation supra with that using the novel process of the present invention (see Example 6 herein). Thus, when the said isothiocyanate was heated with $AlCl_3$, 4,4-dimethyl-1,2,3,4 tetrahydroisoquinoline-1-thione could not be obtained in yields of more than 10% even after several modifications of the standard reaction procedure. The yield could be increased to 65% by using polyphosphoric acid instead of $AlCl_3$ and heating the reaction mixture at 200°C for 24 hours. However, heating the said polyphosphoric acid-containing reaction mixture at 150°C for 10 hours failed to give any yield at all. In comparison, when the isothiocyanate was refluxed at 40°C with triethyloxonium fluoroborate in methylene chloride for 1 hour, 1-ethylthio-4,4-dimethyl-3,4-dihydroisoquinoline was obtained directly in a yield of 80%.

According to the present invention, there is provided a process for preparing a 3,4-dihydro-(aromatic[c]) pyridine or a 3,4,5,6 tetrahydro-(aromatic[c]pyrazine which is substituted in the 1-position by an alkylthio group or a selenium or tellurium analogue thereof, i.e., a compound of formula I:

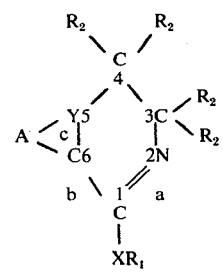

wherein A represents the residue of an aromatic compound of which the pair of adjacent ring atoms shown form part of an aromatic ring; $R_1$ represents an alkyl (including cycloalkyl) group; each $R_2$ independently represents a hydrogen atom or a substituent atom or group or together with another $R_2$ represent a divalent group; X represents a sulphur, selenium or tellurium atom; and Y represents a carbon or nitrogen atom, which comprises contacting a corresponding 2-aromatic-ethyl isocyanate analogue having an unsubstituted ring carbon atom adjacent to the ring atom attached to the ethyl isocyanate analogue group, i.e. a compound of formula II:

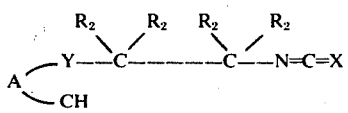

where A, $R_2$, X and Y are as defined above with a compound including the corresponding incipient alkyl carbonium ion, i.e., $R_1^+$:

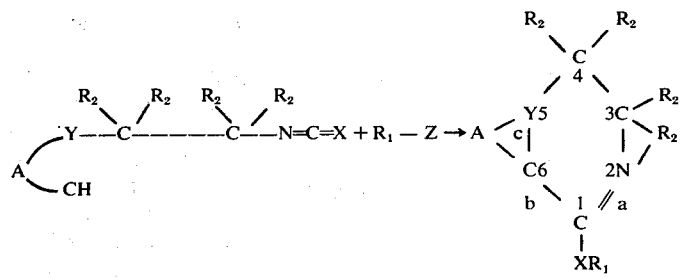

In the above reaction equation, $R_1$ represents an alkyl (including cycloalkyl) group, and Z represents a non-nucleophilic anion, as defined below.

Unless otherwise stated or clearly implied, the term "alkyl" is used in this specification, including the claims thereof, to mean a straight, branched or cyclic alkyl group.

The process of the present inventiion is of general application to reactants of the classes specified but, as with most if not all chemical reactions of general application, there will be reactants or combinations of reactants which will not undergo the desired reaction. In particular, if a reactant has a site which is more active under the reaction conditions than the site required for the desired reaction, reaction will occur at said more active site in preference to, and possibly to the exclusion of, reaction at the desired site. Further, the presence of certain substituent atoms or groups in a reactant molecule may so alter the electron density at the desired reaction site that reaction is no longer possible, at least in commercially viable yields. Additionally, the presence of substituent atoms or groups may sterically hinder the desired reaction. These and other factors may prevent use of certain reactants or combination of reactants in the process of the present invention and as far as possible account should be taken of this when selecting the reactants.

The process involves attack at the nucleophilic site of the X atom by a positive ion and hence all other sites in the reactants should be less nucleophilic than that of the X atom. Thus, for example, the reactants generally should not contain a pyridine or imidazole ring because of the high nucleophilic activity of the ring nitrogen atom or bear an amino, hydrazino or amido group. However, such rings or substituent groups may be present if their nucleophilic activity is reduced to a level below that of the X atom by, for example, quaternisation of the nitrogen atom. The extent of nucleophilic activity at any particular site in a reactant molecule is dependent upon both the atom or group occupying that site and the location of the site within the molecule. Therefore, the comparison of nucleophilic activity between the X atom of the isocyanate reactant and any other site in the reactants must be made having regard to the molecule in which the site exists. Further, the reaction relies upon a sufficient electron density at the unsubstituted ring carbon atom adjacent to the ring atom of the isocyanate reactant to which the ethyl isocyanate analogue group is attached. Accordingly, the isocyanate reactant must not bear an electron withdrawing group of sufficient strength and so located in the molecule that the electron density at said unsubstituted carbon atom is reduced to a level at which the desired reaction no longer occurs. The level of electron density required cannot be defined in general terms but it is below the normal level of the methylidyne (i.e., —CH=) groups in an unsubstituted benzene ring.

Alkyl carbonium ions are positively charged intermediates formed by the removal of a pair of electrons from a carbon atom of a monovalent aliphatic hydrocarbon radical. They have only a transient existence as such but do exist in solvated form such as in trialkyloxonium [i.e., $(R_1)_3O^+$] and dialkyloxycarbonium [i.e., $HC^+(OR_1)_2$] ions. Conveniently such solvated ions are supplied to the reaction mixture in combination with such non-nucleophilic anions as $BF_4^-$;

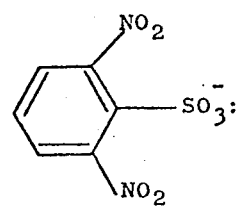

$AuCl_4^-$; $AlCl_4^-$; $SbCl_6^{--}$; $FeCl_4^-$; and $PtCl_6^{--}$. Another suitable source of incipient alkyl carbonium ions are the alkyl esters of strong acids such as fluorosulphonic acid ($FSO_3H$) and perfluorinated alkyl sulphonic acids especially $CF_3SO_3H$, $C_4F_9SO_3H$. A preferred class of compound having an incipient carbonium ion are the trialkyloxonium tetrafluoroborates.

The radical from which the incipient carbonium ion $R_1^+$ is derived may be a straight or branched chain or cyclic alkyl radical. Said radical may bear a substituent atom or group which permits of formation of an incipient alkyl carbonium ion and is inert under the reaction conditions in that it does not prevent formation of the desired alkylenethioimidate or analogous seleno or telluro substituent on the aromatic reactant. Preferably, the carbonium ion $R_1^+$ contains one to six carbon atoms. An especially preferred class of incipient alkyl carbonium ions are those derived from unsubstituted alkyl groups containing from one to four carbon atoms, i.e., methyl, ethyl, propyl and butyl. Where as above and elsewhere in this specification, reference is made to a substituent without specifying its isomeric state, that substituent includes all its isomers singly and in admixture. Thus for example reference as above to butyl includes n-, iso, s- and tert-butyl.

The isocyanate reactant may be carbocyclic or, subject to the proviso that no ring hetero-atom is as nucleophilic as the X-atom in the appropriate isocyanate reactant, heterocyclic and may have an aromatic nucleus constituted by a single ring or fused ring system. Examples of suitable aromatic nuclei include those of benzene, naphthalene, thiophen, pyrrole and indole. When the aromatic nucleus contains an imino nitrogen atom, e.g. pyrrole and indole, the ethyl isocyanate analogue group can be attached to said nitrogen atom or to any of the ring carbon atoms.

The nucleus of the isocyanate reactant may bear one or more substituents. Such substituents must be inert under the reaction conditions in that they do not prevent the desired reaction from taking place. Thus, as explained above, they must be less nucleophilic in the molecule than the X-atom in the appropriate isocyanate reactant and must not sterically hinder the desired reaction. Further, if they are electron-withdrawing in nature they may not occupy a position in the molecule which will reduce the electron density of the reactive unsubstituted ring carbon atom to an inactive level. Examples of substituent atoms or groups which may be present on the aromatic nucleus are halogen atoms; alkyl groups optionally substituted by one or more alkoxy, halogen or phenyl; alkoxy groups; cycloalkyl groups; alkylenedioxy; and phenyl optionally substituted by one or more alkyl, alkoxy or halogen. Preferably any or each alkyl group or alkyl moiety contains from one to six carbon atoms. Specific examples of suitable substituents are fluorine, chlorine, bromine, iodine, methyl, ethyl, propyl, butyl, pentyl, hexyl, 2-methoxy-ethyl, ethoxymethyl, 4-methoxybutyl, 2-chloroethyl, 2-iodoethyl, 2-bromoethyl, 2-fluoroethyl, 2-chloropropyl, 3-fluoropropyl, trifluoromethyl, trichloromethyl, 5-bromopentyl, 3-methyl-5-iodopentyl, benzyl, methoxy, ethoxy, butoxy, hexyloxy, cyclopropyl, cyclobutyl, cyclohexyl, methylenedioxy, phenyl, tolyl, 1-ethoxyphenyl, 3-propoxyphenyl, 1-chlorophenyl and 2-bromophenyl.

Each methylene group of the ethyl isocyanate analogue group may be substituted by one or more atoms or groups represented in formula I by $R_2$ which are inert under the reaction conditions in that they do not prevent the desired reaction from taking place. Thus as explained above, they must be less nucleophilic in the molecule than the X-atom in the isocyanate analogue grouping and must not sterically hinder the desired reaction.

Examples of suitable $R_2$ atoms and groups are hydrogen; alkyl groups optionally substituted by one or more alkoxy, halogen or phenyl; alkoxy groups; and phenyl optionally substituted by one or more halogen, alkyl or alkoxy. Alternatively, two $R_2$ symbols may together represent an alkylene group which with the adjacent ring carbon atom or atoms constitutes a cycloalkyl group. Preferably any or each alkyl group or moiety contains one to six carbon atoms. Specific examples of suitable $R_2$ atoms and groups are methyl, ethyl, propyl, butyl, hexyl, 2-methoxy-ethyl, ethoxymethyl, 4-methoxybutyl, 2-chloroethyl, 2-iodoethyl, 2-bromoethyl, 2-fluoroethyl, 2-chloropropyl, 3-fluoropropyl, 5-bromopentyl, 3-methyl-5-iodopentyl, benzyl, methoxy, ethoxy, butoxy, hexyloxy, cyclopropyl, cyclobutyl, cyclohexyl, phenyl, tolyl, 1-ethoxyphenyl, 3-propoxyphenyl, 1-chlorophenyl and 2-bromophenyl.

A preferred class of isocyanate reactant is constituted by those compounds of formula III:

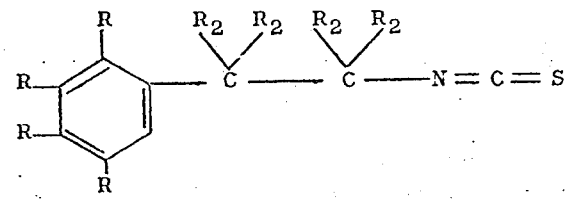

wherein each R independently represents hydrogen; halogen; $C_1$-$C_6$ alkyl optionally substituted with halogen; or $C_1$-$C_6$ alkoxy, or a pair of adjacent R symbols represent $C_1$ or $C_2$ alkylenedioxy group, and each $R_2$ independently represents hydrogen; $C_1$-$C_6$ alkyl optionally substituted with halogen; phenyl optionally substituted with halogen, $C_1$-$C_6$ alkyl or $C_1$-$C_6$ alkoxy; or phenyl-$C_1$-$C_6$ alkylene optionally substituted in the phenyl moiety with halogen, $C_1$-$C_6$ alkyl or $C_1$-$C_6$ alkoxy.

The reaction of the invention may be performed by mixing the reactants in the presence or absence of an inert solvent at ambient or elevated temperatures. A suitable temperature range is from 20° to 150°C, more especially 40°–100°C, and suitable solvents include chloroform, methylene chloride and diethylsulphate. When using a solvent having its boiling point within the said range, it is preferred to reflux the reactant mixture.

The 1-substituted-3,4-dihydro-aromatic[c]pyridines prepared by the process of the present invention are valuable chemical intermediates in the preparation of, for example, the corresponding 1-amino compounds. In particular, the 1-alkyl-thio, -seleno, or -telluro -3,4-dihydroisoquinolines are intermediates in the preparation of pharmaceutically active 1-amino-3,4-dihydroisoquinolines as described in U.K. Pat. Nos 1,244,501 (Aspro-Nicholas) and 1,264,485 (Rhone-Poulenc). Accordingly, the present invention provides also a method of preparing 1-amino-3,4-dihydro-aromatic[[c]pyridines which comprises preparing the corresponding 1-alkylthio, -seleno, or -telluro-3,4-dihydro-aromatic[c]pyridine by the novel process previously described and then reacting said intermediate with an amine in manner known per se. In a preferred embodiment of this two stage process, 1-amino-3,4-dihydroisoquinolines are prepared by first preparing the corresponding 1-alkyl-thio, -seleno, or -telluro-3,4-dihydro-isoquinoline by the novel process and then reacting said intermediate with the corresponding amine. The reaction parameters required for the second stage of said two stage processes are set forth in the specifications of the aforementioned U.K. Patents.

The following Examples illustrate the present invention:

EXAMPLE 1

Preparation of 1-ethylthio-3,4-dihydroisoquinoline

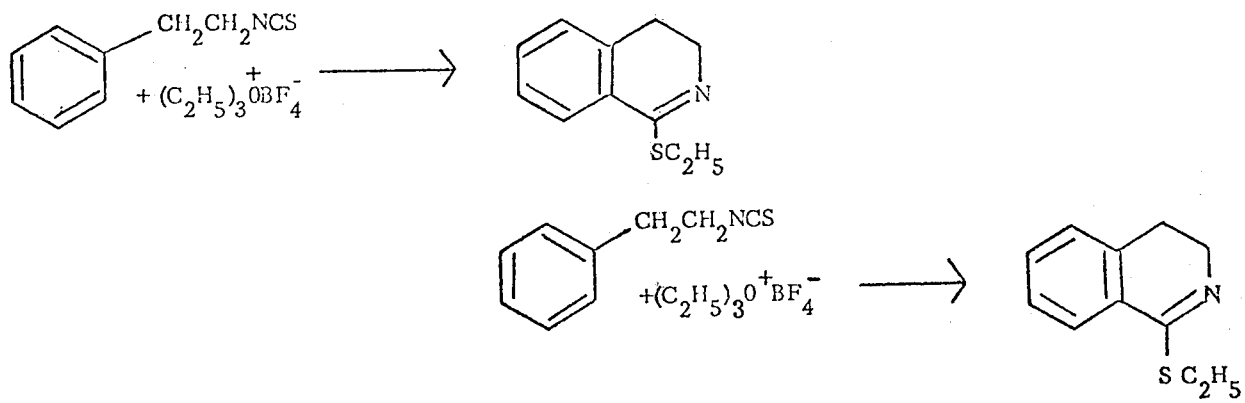

2-Phenylethyl isothiocyanate (132.7 g; 0.82 mole) was added dropwise to a stirred solution of triethyloxonium tetrafluoroborate (190 g; 1 mole) in anhydrous methylene chloride (350 ml.). The solution was heated under reflux for half an hour, the methylene chloride evaporated off and the residue heated at 100°C for 1 hour during which time ether distilled off.

The cooled residue was basified by the addition of 2N sodium hydroxide, the oily layer extracted with ether and the ethereal solution washed with 5N hydrochloric acid (250 ml). Basification of the acidic aqueous extract with 5N sodium hydroxide liberated an oily base which was isolated by ether extraction. Distillation of the dried (MgSO₄) ether extract gave 1-ethylthio-3:4-dihydroisoquinoline b.p. 109°–111°C/0.7 mm (135g; 87%).

EXAMPLE 2

Preparation of 1-ethylthio-3,4-dihydroisoquinoline

2-Phenylethyl isothiocyanate (16.3g; 0.1 mole) in diethyl sulphate (30 ml) was added to a stirred solution of triethyloxonium tetrafluoroborate (19g; 0.1 mole) in diethylsulphate (50 ml) and the temperature of the mixture gradually raised to 110°C where it was held for 1½ hours. Ether was distilled off during this period. The diethyl sulphate was distilled off under reduced pressure and the cooled residue treated with dilute sodium hydroxide (2N). The oil was separated off using ether as solvent and the ethereal solution extracted with 2.5N hydrochloric acid. Basification of the acidic aqueous extract with 5N sodium hdyroxide liberated as an oil 1-ethylthio-3,4-dihydroisoquinoline b.p. 109°–111°C/0.7 mm (14g. 73%).

EXAMPLE 3

Preparation of 1-methylthio-6,7-dimethoxy-3,4-dihydroisoquinoline

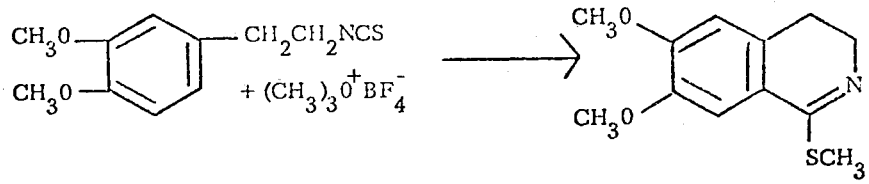

A mixture of 2-(3:4 dimethoxyphenyl)ethyl isothiocyanate (6.69g; 0.03 mole) and trimethyloxonium tetrafluoroborate (4.44g; 0.03 mole) in chloroform (50 ml) was refluxed with stirring for 1½ hours. The chloroform was evaporated and the residue treated with 2.5N sodium hydroxide solution. The product 1-methylthio-6:7-dimethoxy-3:4-dihydroisoquinoline (5.5g 77.5%) was liberated as an oil which slowly crystallised to a solid m.p. 94°–6°C.

EXAMPLE 4

Preparation of 1-ethylthio-3-methyl-3,4-dihydroisquinoline

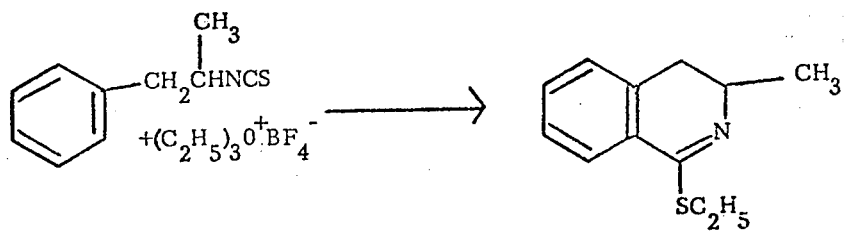

d-2-Phenylisopropyl isothiocyanate (142.7 g; 0.8 mole) was added in a thin stream to a rapidly stirred solution of triethyloxonium tetrafluoroborate (171g; 0.9 mole) in anhydrous methylene chloride (350 ml). The stirred mixture was refluxed for 1 hour, the solvent evaporated and the residue heated on a boiling water bath with stirring. Ether was evolved and the mixture gradually solidified. The cooled solid was triturated with dry ether and the crystalline d-1-ethylthio-3- methyl-3:4-dihydroisoquinoline tetrafluoroborate was filtered off and dried (231 g; 97.5%).

EXAMPLE 5

Preparation of 1-ethylthio-7-methoxy 3,4-dihydroisoquinoline

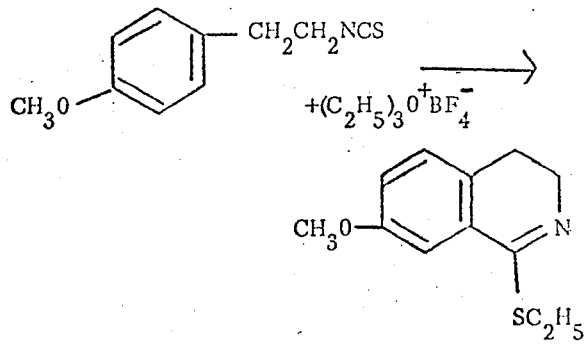

2-(4-Methoxyphenyl)ethylisothiocyanate (28g. 0.145 mole) was mixed with triethyloxonium tetrafluoroborate (0.145 mole) in anhydrous methylene chloride (20 ml) and the solution refluxed for 1 hour. After evaporation of the methylene chloride the cooled residue was treated with water (100 ml) and 5N sodium hydroxide until strongly alkaline. Basic material was extracted with ether and back extracted with dilute hydrochloric acid. The acid solution was basified with sodium hydroxide and the organic base isolated by ether extraction. Distillation of the dried ether solution gave 1-ethylthio-7-methoxy-.75as an oil (24g; 75%).

EXAMPLE 6

Preparation of 1-ethylthio-4,4-dimethyl-3,4-dihydroisquinoline

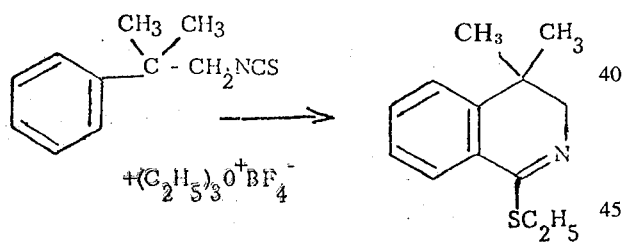

Phenylisobutyl isothiocyanate (31.5g; 0.165 mole) was added dropwise to a stirred solution of triethyloxonium tetrafluoroborate (32g) in anhydrous methylene chloride (100 ml). The solution was heated under reflux for 1 hour, the methylene chloride evaporated off and the residue heated at 100°C for 1 hour during which time ether distilled off. The cooled residue was basified by the addition of 2N sodium hydroxide, the oily layer extracted into ether and the ethereal solution washed with 5N hydrochloric acid. Basification of the acidic aqueous extract with 5N sodium hydroxide liberated an oily base which was isolated by ether extraction. Distillation of the dried ether solution gave 1-ethylthio-4:4-dimethyl;3:4-dihydroisoquinoline as an oil (29 g; 80%).

The following comparative Examples 6A and 6B illustrate the improved yield obtainable by the process of the present invention when using 2-phenylisobutylisothiocyanate as starting material.

EXAMPLE 6A (comparative)

Cyclisation with aluminium trichloride

Anhydrous aluminium trichloride (6.7g, 0.05 mole) was added during 2 hours to a solution of phenylisobutylisothiocyanate (4.75g, 0.025 mole) in trichloroethylene (5 ml) whilst stirring at 0°C. The resulting yellow slurry was stirred for 8 hr at 0°C but, on warming to room temperature for the work-up, the mixture blackened. The product was extracted with ether after evaporation of the solvent from the reaction mixture. Concentration of the ether layer gave a black tar which was chromatographed on silica using chloroform light petroleum (20:80) as the eluent. A yellow crystalline solid was obtained (4,4-dimethyl-1,2,3,4-tetrahydroisoquinoline 1-thione), m.p. 108°C (Yield 0.4g).

Other Lewis acids were used in an exactly similar way to that described above. With SnCl₄ the yield was 0.4 g and with BF₃, the yield was 0.9g.

EXAMPLE 6B

Cyclisation with polyphosphoric acid (PPA)

PPA (47g) was stirred at 200°C and phenylisobutylisothiocyanate (4.75g) added over 30 min. Stirring was continued at this temperature for 20 hours and then the mixture was cooled. It was poured into water (100 ml) and the dark oil which separated was extracted with ether and dried (MgSO₄). Concentration of the ether layer gave a black solid, which was triturated with light petroleum to give a yellow solid, m.p. 100°C (Yield 3.0 g).

Less severe conditions than those described above (i.e. 100° for 10 hours; 150° for 10 hours) failed to give any of the cyclised product.

EXAMPLE 7

Preparation of 1-ethylthio-6-bromo-3,4-dihydroisoquinoline

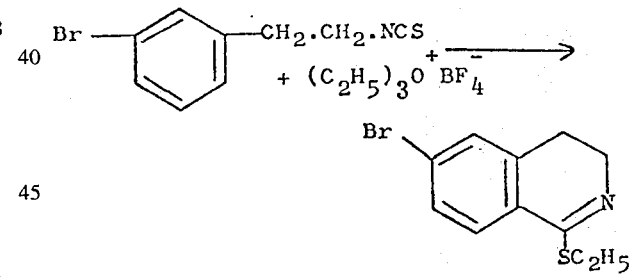

The process of Example 2 was repeated using 2-(m-bromo-phenyl) ethyl isothiocyanate as the isocyanate reactant to yield 1-ethylthio-6-bromo-3,4-dihydroisoquinoline b.p. 126°–9°C/0.1 mm (56.5% yield).

EXAMPLE 8

Preparation of 1-ethylthio-4-n-butyl-3,4-dihydroisoquinoline

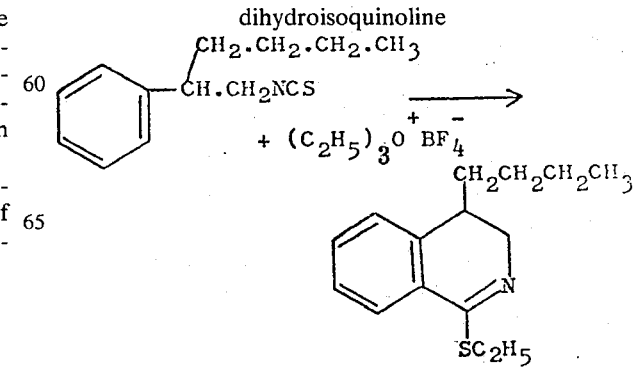

The process of Example 2 was repeated using 2-phenyl-n-hexyl isothiocyanate as the isocyanate reactant to yield 1-ethylthio-4-butyl-3,4-dihydroisoquinoline b.p. 122°–4°/0.2 mm (72% yield).

EXAMPLE 9

Preparation of 1-ethylthio-4-phenyl-3,4-dihydroisoquinoline

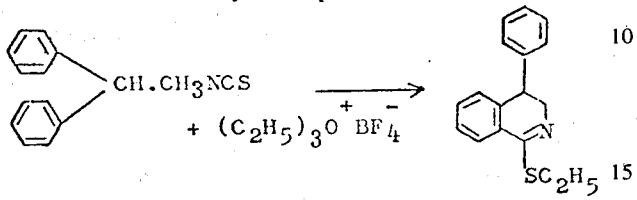

The process of Example 2 was repeated using 2,2-diphenyl-ethyl isothiocyanate as the isocyanate reactant to yield 1-ethylthio-4-phenyl-3,4-dihydroisoquinoline b.p. 161°C/0.15 mm (55% yield).

EXAMPLE 10

Preparation of 1-methylthio-3,4-dihydro (thieno[3,2-c]) pyridine fluorosulphonate

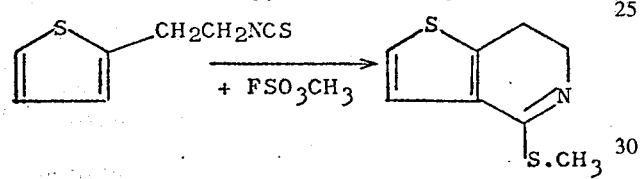

2-Thien-2'-yl ethyl isothiocyanate (0.8 mole) was added slowly to a rapidly stirred solution of methyl fluorosulphonate (0.8 mole) in anhydrous methylene chloride (350 ml). The stirred mixture was refluxed for one hour, the solvent evaporated and the residue heated on a boiling water bath whilst stirring. The mixture gradually solidified to 1-methylthio-3,4-dihydro (thieno[3,2-c]) pyridine fluorosulphonate. After purification the said salt had a melting point of 191°C and was present in a yield of 62%.

Having regard to the foregoing disclosure, the following is claimed as the inventive and patentable embodiments thereof:

1. A process for preparing a 1-alkylthio-3,4-dihydro (aromatic [c]) pyridine in which the aromatic group is selected from the group consisting of phenyl and thienyl and the alkylthio has from one to six carbon atoms, which comprises the step of contacting a corresponding 2-aromatic-ethyl isothiocyanate having an unsubstituted ring carbon atom adjacent to the ring carbon atom attached to the ethyl isothiocyanate group and in which the aromatic group is selected from the group consisting of phenyl and thienyl with a compound including the corresponding incipient alkyl carbonium ion having from one to six carbon atoms.

2. A process as claimed in claim 1 wherein the reactant has the formula:

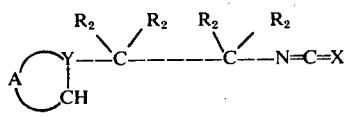

wherein

A represents the residue of benzo or thieno of which the pair of adjacent ring atoms shown form part of the benzo or thieno ring;

X represents sulfur; and each $R_2$ individually represents an inert substituent which does not sterically hinder the reaction selected from the class consisting of hydrogen; alkyl; alkoxy-alkyl; halogenoalkyl; phenalkyl; alkoxy; phenyl; alkoxyphenyl; monohalogeno-phenyl; and alkylphenyl; each alkyl and alkoxy having from one to six carbon atoms; or with another $R_2$ represents alkylene having from one to six carbon atoms which constitutes with the adjacent ring carbon atom or atoms a cycloalkyl group having from three to eight carbon atoms.

3. A process as claimed in claim 2 wherein each $R_2$ individually is selected from the class consisting of hydrogen, methyl and methoxy.

4. A process as claimed in claim 1 wherein the aromatic ring is benzene.

5. A process as claimed in claim 4 wherein the product is a 1-alkylthio-3,4-dihydroisoquinoline.

6. A process as claimed in claim 1 wherein the aromatic group is phenyl.

7. A process as claimed in claim 1 wherein the compound including the incipient alkyl carbonium ion is a salt of the solvated alkyl carbonium ion, the alkyl having from one to six carbon atoms, with an anion selected from the group consisting of:

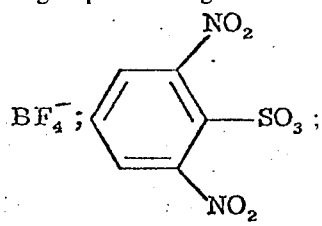

$AuCl_4^-$; $AlCl_4^-$; $SbCl_6^{--}$; $FeCl_4^-$; and $PtCl_6^{--}$; $FSO_3^-$; and $CF_3SO_3^-$; $C_4F_8SO_3^-$.

8. A process as claim in claim 7 wherein the compound including the incipient alkyl carbonium ion is a trialkyl-oxonium tetrafluoroborate, the alkyl having from one to six carbon atoms.

9. A process as claimed in claim 1 wherein the compound having the incipient alkyl carbonium ion is an alkyl ester, the alkyl having from one to six carbon atoms, of a strong acid selected from the group consisting of fluorosulphonic acids and perfluorinated alkyl sulphonic acids.

10. A process as claimed in claim 1 wherein the alkyl carbonium ion is derived from a straight or branched chain unsubstituted $C_1$–$C_6$ alkyl group.

11. A process as claimed in claim 10 wherein the alkyl carbonium ion is selected from the class consisting of methyl and ethyl carbonium ions.

12. A process as claimed in claim 1 wherein the temperature is in the range 40° to 100°C.

13. A process as claimed in claim 12 wherein the reaction is carried out in a solvent under reflux conditions.

14. A process for preparing a 1-alkylthio-3,4-dihydro-benzo or thieno pyridine having the formula:

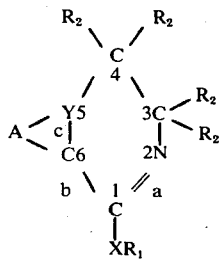

wherein A represents the residue of benzo or thieno of which the pair of adjacent ring atoms shown form part of the benzo or thieno ring; X is sulfur; $R_1$ is an alkyl group having from one to six carbon atoms; $R_2$ is an inert substituent which does not sterically hinder the reaction selected from the class consisting of hydrogen; alkyl; alkoxy-alkyl; halogenoalkyl; phenalkyl; alkoxy; phenyl; alkoxyphenyl; halogenophenyl; and alkylphenyl; each alkyl and alkoxy having from one to six carbon atoms; or together with another $R_2$ represents alkylene having from one to six carbon atoms which constitutes with the adjacent ring carbon atom or atoms a cycloalkyl group having from three to eight carbon atoms which comprises the step of reacting a 2-phenyl or -thienyl ethylisothio-cyanate having the formula:

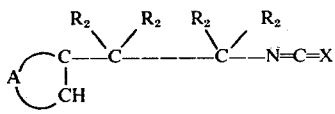

in which A represents the residue of benzo or thieno, of which the pair of adjacent ring atoms shown form part of the benzo or thieno ring and $R_2$ is an inert substituent which does not sterically hinder the reaction selected from the group consisting of hydrogen; alkyl, alkoxyalkyl; halogenoalkyl; phenalkyl; alkoxy; phenyl; alkoxy-phenyl; halogenophenyl; and alkylphenyl; each alkyl and alkoxy having from one to six carbon atoms;

or together with another $R_2$ represents alkylene having from one to six carbon atoms which constitutes with the adacent ring carbon atom or atoms a cycloalkyl group having from three to eight carbon atoms; with a compound having the formula $R_1Z$, in which $R_1$ is an alkyl group having from one to six carbon atoms, and Z is an anion selected from the group consisting of:

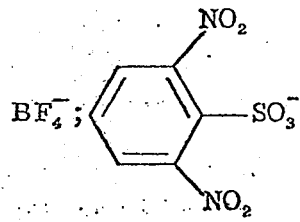

$AuCl_4^-$; $AlCl_4^-$; $SbCl_6^{--}$; $FeCl_4^-$; and $PtCl_6^{--}$; $FSO_3^-$; and $CF_3SO_3^-$; $C_4F_8SO_3^-$.

15. A process as claimed in claim 14, in which the reaction temperature is within the range from about 40° to about 100°C.

16. A process in accordance with claim 14 in which the reaction is carried out in a solvent under reflux.

17. A process in accordance with claim 14 in which the reaction product is a 1-alkylthio-3,4-dihydroisoquinoline.

* * * * *

UNITED STATES PATENT OFFICE
CERTIFICATE OF CORRECTION

Patent No. 3,895,014     Dated July 15, 1975

Inventor(s) Maurice Ward Gittos     Page 1 of 3

It is certified that error appears in the above-identified patent and that said Letters Patent are hereby corrected as shown below:

[54] in the title, "(AROMATIC[c])" should be -- AROMATIC (c) --
[56] References Cited "Giltos et al" should be -- Gittos et al --
   Other Publications "Giltos et al" should be -- Gittos et al --
Column 1, line 2 in the title      "(AROMATIC [C])" should be --AROMATIC (C) --

Column 3, line 12 :

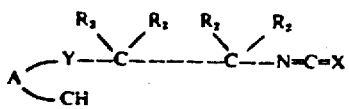

should be

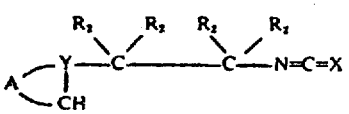

Column 3, line 22 :

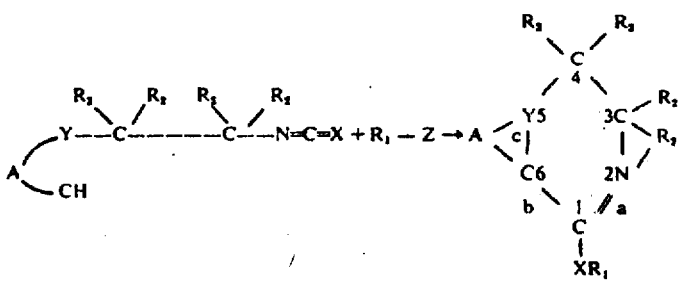

should be

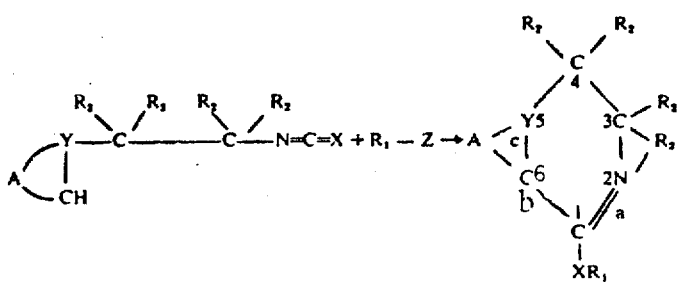

UNITED STATES PATENT OFFICE
CERTIFICATE OF CORRECTION

Patent No. 3,895,014  Dated July 15, 1975

Inventor(s) Maurice Ward Gittos

It is certified that error appears in the above-identified patent and that said Letters Patent are hereby corrected as shown below:

Column 3, line 41 : "inventiion" should be -- invention --

Column 8, line 6 : "hdyroxide" should be -- hydroxide --

Column 9, line 32 : "1-ethylthio-7-methoxy-.75" should be -- 1-ethylthio-7-methoxy-3:4-dihydro isoquinoline --

Column 11, line 60 :

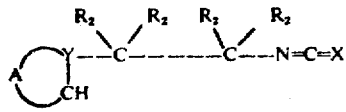

should be

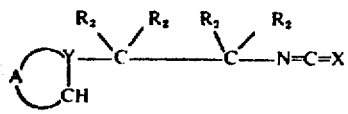

Column 12, line 36 : "$C_4F_8SO_3^-$" should be -- $C_4F_9SO_3^-$ --

Column 12, line 37 : "claim" should be -- claimed --

UNITED STATES PATENT OFFICE
CERTIFICATE OF CORRECTION

Patent No. 3,895,014  Dated July 15, 1975

Inventor(s) Maurice Ward Gittos

It is certified that error appears in the above-identified patent and that said Letters Patent are hereby corrected as shown below:

Column 12, line 65 :

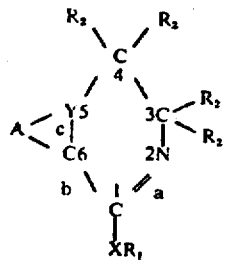

should be

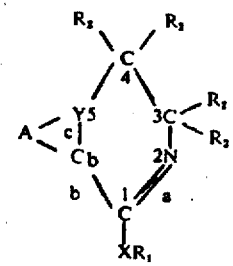

Column 13, line 20 :

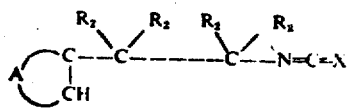

should be

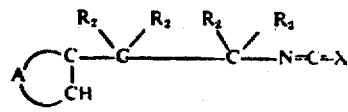

Signed and Sealed this

Twenty-fourth Day of August 1976

[SEAL]

Attest:

RUTH C. MASON
Attesting Officer

C. MARSHALL DANN
Commissioner of Patents and Trademarks